2,998,394
ELECTRICAL RESISTOR COMPOSITION
Fedia R. Charvat, Williamsville, N.Y., assignor to Union
Carbide Corporation, a corporation of New York
No Drawing. Filed May 25, 1960, Ser. No. 31,556
24 Claims. (Cl. 252—518)

This invention relates to a composition suitable for use at elevated temperatures as an electrical resistor. More particularly, this invention relates to a composition suitable for use as an electrical resistor and exhibiting strength and oxidation resistance at elevated temperatures.

Molybdenum disilicide, $MoSi_2$, is a substance which possesses many properties which are desirable in an electrical heating element. For example, higher temperatures can be obtained with the use of $MoSi_2$ heating elements and, in addition, molybdenum disilicide exhibits negligible increase in resistance with time as compared to other materials. Further, the life of a molybdenum disilicide heating element is about 4 to 5 times that of conventional heating elements, and in addition the strength and corrosion resistance properties of molybdenum disilicide are superior to those of other heating element materials.

However, molybdenum disilicide has a relatively low electrical resistivity which at room temperature is approximately 30 micro-ohm-centimeters, about the same as that of highly alloyed steels. Moreover, because of its brittle nature, molybdenum disilicide cannot be readily formed into extended elements having small cross-section to provide increased electrical resistance. As a result, the fabrication of $MoSi_2$ heating elements is limited to shapes having relatively large cross-sections and consequently low values of electrical resistance.

Accordingly, it is an object of this invention to provide a composition suitable for use as an electrical resistance at elevated temperatures which, while containing molybdenum disilicide as the resistive material, nevertheless has a resistivity substantially greater than that of molybdenum disilicide.

It is another object of this invention to provide a composition suitable for use as an electrical resistor at elevated temperatures and having superior strength and resistance to oxidation and corrosion.

A further object of this invention is to provide a process for the manufacture of electrical resistors having molybdenum disilicide as the resistive material thereof.

These and other objects will be apparent from the following description and appended claims.

In accordance with the present invention, a sintered mixture consisting essentially of from about 10 to about 60 percent by volume clay with the balance being molybdenum disilicide is provided as an electrical resistor. The term "clay" as it is employed in this description and in the claims refers to clay having a maximum silica to alumina ratio of about 2:1 and containing a maximum of about 0.5 percent by weight in the aggregate of oxidizable material, aluminate formers and silicate formers.

An electrical resistor in accordance with the present invention may be formed by sintering in a non-reactive environment a mixture consisting essentially of from about 10 to about 60 percent by volume clay with the balance being molybdenum disilicide. The electrical resistor of this invention has substantially greater electrical resistivity than molybdenum disilicide, while retaining the advantageous properties of molybdenum disilicide.

Moreover, the resistor of this invention is resistant to oxidation and may be employed in oxidizing atmospheres for prolonged periods of time at elevated temperatures up to about 1700° C. On exposure to air at elevated temperatures the resistor of this invention develops a glassy skin which serves to protect the underlying molybdenum material from oxidation.

Further, due to the clay addition, extrudable mixes may be prepared from the composition of this invention having a plastic consistency highly suitable for expressing through a die to produce a variety of useful shapes. In addition, the composition of this invention possesses excellent slip casting characteristics.

The benefits obtained in the practice of the present invention are largely due to the employment of clays having a maximum silica to alumina ratio of about 2:1 and which are substantially free from oxidizable material, aluminate formers and silicate formers.

When an electrical resistor is produced in accordance with the present invention from $MoSi_2$ and clay the effective cross section of the conductive molybdenum disilicide is reduced due to the non-conductive clay addition, thereby providing a resistor having increased resistivity; further, a protective layer of glass, derived from the clay, surrounds the conductive $MoSi_2$ and provides protection against oxidation of the molybdenum material. It is essential that the clay employed in the production of the resistor have a maximum silica to alumina molecular ratio of about 2:1 since the glassy material derived from such clay provides in the resistor a stable mechanical mixture having a conductive phase of $MoSi_2$ and a non-conductive protective phase. Further, the glassy material from such clay sufficiently protects the conductive molybdenum material from oxidation and does not cause the resistor to drip, deform or experience other undesirable effects. In addition to having a maximum silica to alumina ratio of about 2:1 it is essential that the clay contain no more than about 0.5 percent by weight in the aggregate of oxidizable material, silicate formers and aluminate formers, i.e., the clay should not contain more than about 0.5 percent by weight of such materials as elemental metals, oxides of alkali metals, oxides of alkaline earth metals and oxides of iron. Clay which contains more than about 0.5 percent of these materials will not provide a resistor having satisfactory oxidation-resistant properties.

The employment of clays, such as described hereinabove, provides for the production of highly satisfactory electrical resistors; however, kaolin type clays are preferred in the practice of the present invention. It has been found that, in addition to other advantages, the use of kaolin provides a sintered mixture having a very highly defined two-phase structure which is extremely stable and which has a high degree of uniformity. The amount and distribution of the glassy material as derived from kaolin ensures that the conductive molybdenum material is protected against oxidation, and further, that the contacts between the particles of the conductive phase are highly efficient and continuous during service at temperatures up to about 1700° C. Further, electrical resistors formed from kaolin and $MoSi_2$ have been found to have an extremely stable structure and an exceptionally long life in continuous service at elevated temperatures.

It has been found that when other materials, such as alumina, are used in a compact mixture with molybdenum disilicide the resulting composition exhibits a lack of oxidation resistance, especially when the alumina constitutes more than about 15 to 20 percent by volume of the mixture. On exposure to air at elevated temperatures such specimens fail to develop the glassy material which serves to protect the molybdenum material from oxidation. When silica alone is used in a compact with molybdenum disilicide, an excessive amount of glassy material is developed which tends to drip and run off; further, due to the semi-liquid nature of silica, the compact becomes deformed in service, particularly at elevated temperatures.

Artificial mixtures of alumina and silica, and minerals such as kyanite, in addition to being subject to some extent to oxidation and/or deformation, do not have the plastic properties of clay and hence, the extrusion of these materials cannot be readily accomplished.

The composition of the present invention is prepared by incorporating clay into powder metallurgical mixtures of molybdenum disilicide in the proportions disclosed herein. A process in accordance with the present invention for the manufacture of electrical resistors comprises providing a mixture consisting essentially of clay and molybdenum disilicide, the ratio by volume of clay to molybdenum disilicide in said mixture being from about 1:9 to about 6:4; and sintering said mixture in a non-reactive environment.

Electrical resistors in accordance with the present invention are most satisfactorily fabricated by extrusion or slip casting techniques. Owing to the plasticity of the clay addition, stable slips and readily extrudable mixes may be prepared by employing techniques known to the art. After fabrication of an article from the particulate mixture, by extrusion or slip casting, the article is consolidated. Consolidation may be effected by sintering at an elevated temperature from about 1500° C. to about 1600° C. in a non-reactive atmosphere. It has been found that non-oxidizing, neutral or slightly reducing atmospheres are satisfactory for the sintering operation; a vacuum is also suitable.

In some instances, it may be desirable to produce a surface glaze on the article prior to the employment thereof in its intended operation. This may be accomplished by heating the sintered article in air at an elevated temperature; heating at about 1450° C. for about 1 hour, has been found to provide a satisfactory surface glaze. A satisfactory glaze may be formed at temperatures as low as about 1250° C.; however, temperatures of about 1400° C. to about 1500° C. are preferred since at these temperatures a highly satisfactory glaze is provided in a relatively short period of time. At temperatures below about 750° C. a satisfactory surface glaze is not obtained.

A further process which satisfies the present invention comprises providing an extrudable mixture of clay and molybdenum disilicide, the ratio by volume of clay to molybdenum disilicide in said mixture being from about 1:9 to about 6:4; extruding the said mixture to form a shaped article and sintering the shaped article in a non-reactive environment.

Still another process which satisfies the present invention comprises preparing a slip of clay and molybdenum disilicide, the ratio by volume of clay to molybdenum disilicide in said slip being from about 1:9 to about 6:4; slip casting the prepared slip to form a shaped article and sintering the shaped article in a non-reactive environment.

Although slip casting and extrusion techniques are preferred, other fabricating methods known to the art may be employed; this versatility is an important aspect of the composition of the present invention.

The following examples are presented to illustrate the principle of the present invention. The clay employed in the following examples is kaolin. The kaolin had a silica to alumina ratio of less than 2:1; oxidizable material, aluminate formers and silicate formers in the kaolin totaled up to about 0.5 percent by weight.

*Example I*

The following materials were intensively mixed in a porcelain mortar: 100 grams of molybdenum disilicide, 100 grams of kaolin, 10 grams of cereal binder, 0.6 gram of a sulfonate of pine wood lignin, and 25 ml. of water. The mix was expressed through a 0.400 inch diameter die at a pressure of 2000 lbs./sq. in. by means of a 1 inch screw-driven plunger to form an extruded bar. After thorough drying, the extruded bar was sintered for about 2 hours at 1600° C. in an argon atmosphere. Upon heating the specimen in air to 1450° C. for 48 hours, no change in microstructure or resistivity of the sample could be discerned. The resistivity of the specimen at room temperature was approximately 420 micro ohm-cm. as compared to a resistivity of 30 micro ohm-cm. for $MoSi_2$ at room temperature.

*Example II*

Another specimen having the same composition as that of Example I was prepared from the same materials and in the same manner. The resistivity of the specimen was measured at room temperature and the specimen was heated in air to 1450° C. and held at this temperature for 100 hours. Upon cooling the specimen to room temperature, the resistivity of the specimen was measured again and was found to be without significant change from the previously measured value. The specimen was then heated in air and the temperature of the specimen was cycled between 1600° C. and 500° C. every 15 minutes for 48 hours. At the end of this period the specimen was cooled to room temperature and the resistivity of the specimen was again measured and found to be without significant change from the previously measured values.

*Example III*

A kaolin slip was prepared by blunging 30 grams of kaolin with 23 ml. of water. To this slip were added 150 grams of $MoSi_2$ wet cake containing 95% solids. Blunging was continued until a material of fluid consistency was obtained. Resistor bars were slip cast from the material in plaster molds and subsequently sintered at 1550° C. in an argon atmosphere for 16 hours. The average resistivity of the sintered bars measured at room temperature was found to be 50.4 micro ohms-cm. or about 66% higher than the resistivity of $MoSi_2$.

The following table sets forth data illustrating the resistivity of compositions of the present invention. The resistivity of molybdenum disilicide is included in the table for purposes of comparison. The resistivity measurements were made on slip-cast, sintered bars except as indicated.

TABLE I

| Composition, percent by volume | Resistivity at Room Temperature, micro-ohm-cm. |
| --- | --- |
| $MoSi_2$ | 30 |
| $MoSi_2$+10% Kaolin | 33.5 |
| $MoSi_2$+10% Kaolin [1] | 37.1 |
| $MoSi_2$+20% Kaolin | 48.6 |
| $MoSi_2$+20% Kaolin [1] | 50.4 |
| $MoSi_2$+30% Kaolin | 61.6 |
| $MoSi_2$+30% Kaolin [1] | 58.8 |
| $MoSi_2$+40% Kaolin | 211.9 |
| $MoSi_2$+40% Kaolin [1] | 200.1 |
| $MoSi_2$+50% Kaolin | 304.9 |
| $MoSi_2$+50% Kaolin [1] | 322.9 |
| $MoSi_2$+60% Kaolin | 432 |

[1] Sintered bar heated in air at 1450° C. for 16 hours to produce surface glaze.

The data in the table clearly illustrates the beneficial results provided by the present invention. It is seen that clay in an amount of about 50% by volume provides an increase in resistivity by a factor of about 10, and that as little as 10% clay provides a substantial increase in resistivity. Addition of clay in amounts greater than 60% produces an excess of glass during service tending to cause the material to deform under its own weight. Moreover, since the resistor of the present invention is in effect a mechanical mixture comprising a conductive phase of $MoSi_2$ and a non-conductive phase provided by the clay, when the clay is present in an amount in excess of about 60 percent by volume the electrical contacts between the particles of the conductive phase are imperfect thereby tending to cause over-heating of the resistor.

Most satisfactory results are obtained with the use of heating elements containing from about 35 percent up to about 60 percent clay; 50 percent clay is preferred in order to obtain maximum resistivity and efficient contact between the $MoSi_2$ particles while avoiding the forma-

What is claimed is:
1. As an electrical resistor, a sintered mixture consisting essentially of from about 10 to about 60 percent by volume clay with the balance being molybdenum disilicide, said clay having maximum silica to alumina ratio of about 2:1 and containing up to a maximum of 0.5 percent by weight in the aggregate of oxidizable material, aluminate formers and silicate formers.
2. A resistor in accordance with claim 1 wherein said clay is kaolin.
3. As an electrical resistor, a surface-oxidized sintered mixture consisting essentially of from about 10 to about 60 percent by volume clay with the balance being molybdenum disilicide and having a surface glaze, said clay having a maximum silica to alumina ratio of about 2:1 and containing up to a maximum of 0.5 percent by weight in the aggregate of oxidizable material, aluminate formers and silicate formers.
4. A resistor in accordance with claim 3 wherein said clay is kaolin.
5. As an electrical resistor, a sintered mixture consisting essentially of from about 35 to about 60 percent by volume clay with the balance being molybdenum disilicide, said clay having a maximum silica to alumina ratio of about 2:1 and containing up to a maximum of 0.5 percent by weight in the aggregate of oxidizable material, aluminate formers and silicate formers.
6. A resistor in accordance with claim 5 wherein said clay is kaolin.
7. As an electrical resistor, a surface oxidized sintered mixture consisting essentially of from about 35 to about 60 percent by volume clay with the balance being molybdenum disilicide and having a surface glaze; said clay having a maximum silica to alumina ratio of about 2:1 and containing up to a maximum of 0.5 percent by weight in the aggregate of oxidizable material, aluminate formers and silicate formers.
8. A resistor in accordance with claim 7 wherein said clay is kaolin.
9. As an electrical resistor, a sintered mixture consisting essentially of about 50 percent by volume clay with the balance being molybdenum disilicide and having a surface glaze; said clay having a miximum silica to alumina ratio of about 2:1 and containing up to a maximum of 0.5 percent by weight in the aggregate of oxidizable material, aluminate formers and silicate formers.
10. A resistor in accordance with claim 9 wherein said clay is kaolin.
11. As an electrical resistor, a surface oxidized sintered mixture consisting essentially of about 50 percent by volume clay with the balance being molybdenum disilicide and having a surface glaze; said clay having a maximum silica to alumina ratio of about 2:1 and containing up to a maximum of 0.5 percent by weight in the aggregate of oxidizable material, aluminate formers and silicate formers.
12. A resistor in accordance with claim 11 wherein said clay is kaolin.
13. A process for the manufacture of electrical resistors which comprises providing a mixture consisting essentially of clay and molybdenum disilicide, said clay having a maximum silica to alumina ratio of about 2:1 and containing up to a maximum of 0.5 percent by weight in the aggregate of oxidizable material, aluminate formers and silicate formers, the ratio by volume of the clay to molybdenum disilicide in said mixture being from about 1:9 to about 6:4; and sintering said mixture in a non-reactive environment.
14. A process in accordance with claim 13 wherein said clay is kaolin.
15. A process for the manufacture of electrical resistors which comprises providing a mixture consisting essentially of clay and molybdenum disilicide, said clay having a maximum silica to alumina ratio of about 2:1 and containing up to a maximum of 0.5 percent by weight in the aggregate of oxidizable material, aluminate formers and silicate formers, the ratio by volume of the clay to molybdenum disilicide in said mixture being from about 1:9 to about 6:4; sintering said mixture in a non-reactive environment and subsequently oxidizing the surface of the sintered mixture to produce a glaze thereon.
16. A process in accordance with claim 15 wherein said clay is kaolin.
17. A process for the manufacture of electrical resistors which comprises providing an extrudable mixture of clay and molybdenum disilicide, and clay having a maximum silica to alumina ratio of about 2:1 and containing up to a maximum of 0.5 percent by weight in the aggregate of oxidizable material, aluminate formers and silicate formers, the ratio by volume of the clay to molybdenum disilicide in said mixture being from about 1:9 to about 6:4; extruding said mixture to form a shaped article and sintering the shaped article in a non-reactive environment.
18. A process in accordance with claim 17 wherein said clay is kaolin.
19. A process for the manufacture of electrical resistors which comprises providing an extrudable mixture of clay and molybdenum disilicide, said clay having a maximum silica to alumina ratio of about 2:1 and containing up to a maximum of 0.5 percent by weight in the aggregate of oxidizable material, aluminate formers and silicate formers, the ratio by volume of the clay to molybdenum disilicide in said mixture being from about 1:9 to about 6:4; extruding said mixture to form a shaped article, sintering the shaped article in a non-reactive environment and subsequently oxidizing the surface of the sintered article to produce a glaze thereon.
20. A process in accordance with claim 19 wherein said clay is kaolin.
21. A process for the production of electrical resistors which comprises preparing a slip of clay and molybdenum disilicide, said clay having a maximum silica to alumina ratio of about 2:1 and containing up to a maximum of 0.5 percent by weight in the aggregate of oxidizable material, aluminate formers and silicate formers, the ratio by volume of the clay to molybdenum disilicide in said slip being from about 1:9 to about 6:4; slip casting said prepared slip to form a shaped article and sintering the shaped article in a non-reactive environment.
22. A process in accordance with claim 21 wherein said clay is koalin.
23. A process for the production of electrical resistors which comprises preparing a slip of clay with molybdenum disilicide, said clay having a maximum silica to alumina ratio of about 2:1 and containing up to a maximum of 0.5 percent by weight in the aggregate of oxidizable material, aluminate formers and silicate formers, the ratio by volume of the clay to molybdenum disilicide in said slip being from about 1:9 to about 6:4; slip casting the said prepared slip to form a shaped article, sintering the shaped article in a non-reactive environment and subsequently oxidizing the surface of the sintered article to produce a glaze thereon.
24. A process in accordance with claim 23 wherein said clay is kaolin.

References Cited in the file of this patent

UNITED STATES PATENTS

| | | |
|---|---|---|
| 2,855,491 | Navias | Oct. 7, 1958 |
| 2,891,914 | Fenity et al. | June 23, 1959 |
| 2,955,145 | Schrewelius et al. | Oct. 4, 1960 |

FOREIGN PATENTS

| | | |
|---|---|---|
| 623,486 | France | Mar. 21, 1927 |
| 1,144,949 | France | Apr. 29, 1957 |

UNITED STATES PATENT OFFICE
CERTIFICATE OF CORRECTION

Patent No. 2,998,394                      August 29, 1961

Fedia R. Charvat

It is hereby certified that error appears in the above numbered patent requiring correction and that the said Letters Patent should read as corrected below.

Column 5, line 45, for "miximum" read -- maximum --; column 6, line 14, for "and", second occurrence, read -- said --.

Signed and sealed this 4th day of September 1962.

(SEAL)
Attest:

ERNEST W. SWIDER
Attesting Officer

DAVID L. LADD
Commissioner of Patents